INVENTOR.
E. P. McMAHON
BY
Bean, Brooks, Buckley & Bean
ATTORNEYS

March 11, 1969 E. P. McMAHON 3,432,833

MAGNETIC CORE OF TAPERED TUBE FORM FOR PROGRESSIVE MAGNETIC SWITCHING

Filed March 29, 1965 Sheet 2 of 2

INVENTOR.
E. P. McMAHON

BY

Bean, Brooks, Buckley + Bean
ATTORNEYS 3,432,833

MAGNETIC CORE OF TAPERED TUBE FORM FOR PROGRESSIVE MAGNETIC SWITCHING

Emmett P. McMahon, Buffalo, N.Y., assignor to Bell Aerospace Corporation, Wheatfield, N.Y.

Filed Mar. 29, 1965, Ser. No. 443,180
U.S. Cl. 340—174 22 Claims
Int. Cl. G11b *5/00;* H01f *27/42;* H03k *17/00*

ABSTRACT OF THE DISCLOSURE

A tapered tube of rectangular B-H loop magnetic material is provided with a conductor extending through it, by means of which the tube may be set initially in one remanent state throughout. The conductor then may apply either pulses to reverse the magnetization of discrete bands of the tube commencing with its smallest end, or the same effect may be produced by applying a slowly varying MMF to the conductor. Various functions may be performed, including multilevel storage in which readout conductors project through slits provided in the wall of the tube at various axial positions.

This invention relates to magnetic-core device and, in particular, is directed to a magnetic-core device in which progressive partial flux reversal or switching is controlled in novel fashion.

A magnetic-core device which is dimensioned to provide closed magnetic paths of increasing lengths and which is initially conditioned to one major remanent (i.e. saturated) magnetic state, can be partially and progressively switched to the opposite major remanent state by the application of a suitable input thereto. The partial switching will initiate at that region of the core offering the least magnetic path length for such switching and will progress therefrom into regions offering progressively greater path lengths so long as the appropriate input is applied. This phenomenon might be utilized in two ways, first by providing an output signal dependent upon the $d\phi/dt$ (the instantaneous change in flux) produced by the switching, and second by information concerning the degree to which the core has been switched. It will be recognized that the first application is suggestive of wave shaping whereas the second application is suggestive of multilevel storage or memory. The usefulness of such a device, for the first application, rests upon whether one can readily exercise control over the $d\phi/dt$ function in response to a given input so as to produce, at will, the desired output and, in the second application, upon whether or not one can accurately and reasonably read the state or degree of switching. To my knowledge, conventional magnetic cores do not lend themselves to the first application in the sense stated, i.e., the $d\phi/dt$ function is not susceptible of control so as to tailor the output signal, at will, to a fixed input signal. The second application, on the other hand, lies within the realm of possibility with conventional multiaperture magnetic cores, but only under pain of the serious restriction that external circuitry must be employed to achieve accurate and meaningful reading. In both cases, the prior art lacks the combination of means for effecting progressive switching and means for uniformly relating progressive switching to total flux of the core.

Basically, then, the present invention is concerned with an improved form of magnetic-core device in which the manner of switching portions of the device from one major remanent state to the opposite major remanent state is controlled in a fashion to produce a particular desired result. That is to say, the progression of switching is constrained to proceed in ordered fashion so that $d\phi/dt$ may be made a desired function of the input switching signal or, alternatively, the physical location of the interface between oppositely magnetized regions of the core may be made a desired function of the input signal, but in any case, the total flux is uniformly controlled with respect to the flux reversing input. In this way, $d\phi/dt$ or the location of the interface may be made linear or non-linear, as desired, with respect to the input signal.

A preferred form of the present invention employs a magnetic core made from magnetic material having rectangular hysteresis loop characteristics and providing easy paths of magnetization circumferentially of the core, wherein the general configuration of the magnetic core is tubular. Additionally, the core is made so that the magnetic path lengths of adjacent circumferential bands of rings of the core are dissimilar. In this way, the core may be initially magnetized in one circumferential direction throughout and subsequently subjected to partial switching or flux reversal in the core commencing with that band having the least magnetic path length.

The preferred form, as aforesaid, lends itself readily to production by thin film techniques which open the way for utilizing minor apertures in such fashion that they do not conflict with uniformity of magnetic path lengths in the immediate vicinity of or at such minor apertures such as is the case with conventional multiaperture magnetic cores.

A serious problem of non-linearity arises with conventional magnetic-core devices designed for analog storage of a digital input which can be overcome only by the use of external circuitry, and then only with difficulty. Specifically, nonlinearity occurs by reason of magnetic path length distortions brought about by the necessary presence of minor apertures for read purposes, and nonlinearity also arises mainly owing to the fact that not all of the pulse voltage applied is available for flux switching and, moreover, decreases with each succeeding pulse as the switching progresses. The present invention relates to a general configuration for a magnetic-core device which overcomes the above objections so that the function of multilevel storage and read may be accomplished without the necessity for external circuitry to accommodate for non-linearities such as those mentioned and others. Specifically, the general configuration according to this invention permits linear digitial-to-analog storage with non-destructive read by elimination of non-linearities arising due to the presence of minor apertures and by elimination of non-linearities in MMF arising due to distortions in magnetic path length.

An object of this invention is to provide a magnetic-core device of generally tubular configuration which is constructed of rectangular loop magnetic material having the easy axis of magnetization oriented circumferentially with respect to the tubular body, and wherein the geometry of the body is such that closed magnetic paths of progressively greater lengths are provided at various sequential stations or cross-sections axially along the body. Stated another way, it is an object of this invention to provide a magnetic-core device characterized by having a major aperture which is dimensionally non-uniform axially thereof so that magnetic path lengths in the core vary at different axial positions thereon.

The present invention is also concerned with a tubular magnetic-core body as aforesaid wherein the maximum change in magnetic path length may be made very small, although finite, so that progressive flux switching may be accomplished by pulse input without introducing significant non-linearity due to a large change in magnetic path length. That is to say, the number of lines switched in response to a fixed increment of voltage-time product may be made essentially constant for each fixed-increment pulse applied. For example, a tubular magnetic core which is the frustum of a right cylindrical cone and having a small included angle to minimize magnetic path length difference may exhibit switching such that the number of lines switched is linearly related to the applied voltage-time product.

Another object of this invention is to provide a magnetic-core device which is capable of being influenced by a slowing varying external MMF to display a degree of partial flux switching which is predictably related to the instantaneous level of an applied monotonic MMF. More particularly, magnetic-core devices, according to this invention, are characterized by the fact that flux switching proceeds progressively along the length of the core body in a fashion precisely related to a slowly varying MMF applied thereto.

The above considerations give rise to many and disparate possibilities as, for example, those previously mentioned. Moreover, the concepts of this invention lend themselves especially to realization by thin film fabrication techniques. In this form, the invention also lends itself readily to multilevel storage or memory applications with non-destructive read and to various applications in which the device performs as a multiaperture magnetic core without, however, certain disadvantages inherent in a conventional multiaperture device. In this latter application, a read winding may take the simple form of a conductor passing through a slit in the wall of the tubular body which does not disturb or distort the major aperture magneitc path length in the region of the slit. Thus, the desired uniform switching response is not disturbed by the presence of one or more minor apertures as aforesaid.

In its broadest aspects, then, the present invention is concerned with means for simply and easily obtaining a precise and desired relation between the switching characteristics in a magnetic-core device and the switching input thereto.

In another of its aspects, the present invention is concerned with multiple aperture magnetic-core devices wherein major aperture magnetic path length is unaffected by the presence of minor apertures.

A further object of the present invention is to provide an improved form of magnetic-core device which lends itself readily to fabrication by thin film techniques.

Another object of this invention resides in the provision of a magnetic-core device which is adaptable to various different applications and wherein many different functions may be performed thereby.

Other objects and advantages of this invention will appear from the description hereinbelow and the accompanying drawing wherein.

Figure 1:
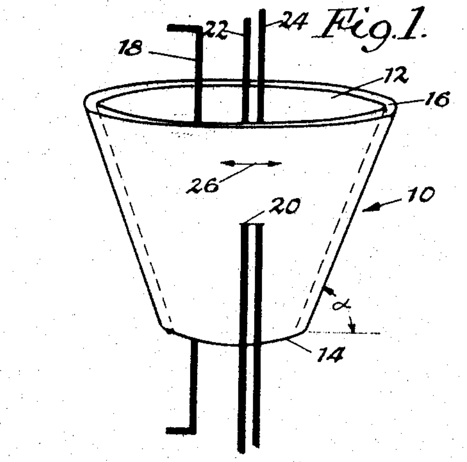
FIG. 1 is a perspective view of one form of magnetic-core device constructed in accordance with this invention.

One of the most important practical applications of the present invention is digital-to-analog storage with non-destructive read, and a device for achieving this function will be described first in conjunction with FIG. 1. In this figure, the magnetic-core device is indicated generally by reference character 10 and will be seen to consist of a generally tubular body having a major aperture 12 extending axially therethrough. The wall of the tube is of uniform thickness and the body tapers from the small end 14 to the large end 16 thereof. A combined preset-input winding is provided which, as shown, takes the form of a single conductor 18 extending axially through the major aperture 12.

Figure 2:
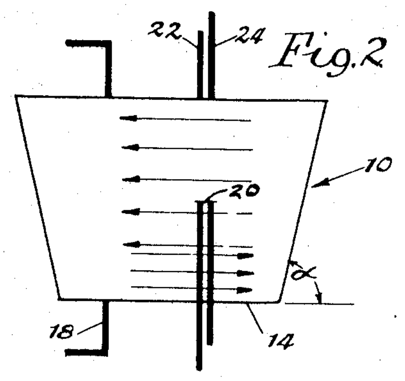
FIG. 2 is an elevational view of the device shown in FIG. 1.
Figure 3:
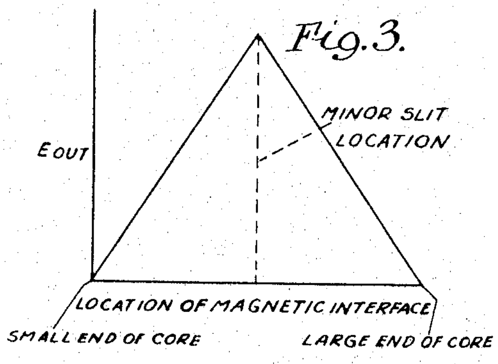
FIG. 3 is a graph illustrating an idealized relation between read output and the location of the magnetic interface in the device shown in FIGS. 1 and 2.

The wall of the tubular body is provided with a circumferentially extending slit 20 which forms a minor aperture and a read input winding 22 and a read output winding 24 extend through the minor aperture as shown. The operation of the device is as follows:

The body 10 is first established in one major remanent state thereof by the application of a suitable preset input through the winding 18. It is assumed that the body is made of rectangular B–H loop material which will provide easy paths of magnetization in the opposite circumferential directions indicated by the double-headed arrow 26, the direction of magnetization being dependent upon the polarity of the preset signal as aforesaid. Thus, the body is initially in one major remanent state throughout Next, a flux reversing signal in the form of a train of pulses of equal voltage-time product is applied through the conductor 18. The voltage-time product of each pulse is of such magnitude as to be effective to switch only a small portion of the core, commencing at the small end, so that at the termination of the input signal, the magnetic interface between the regions of oppositely magnetized material will lie somewhere along the length of the core dependent upon the voltage amplitude-time product of each pulse and the number of pulses applied. Such a condition is illustrated in FIG. 2 where the direction of the arrows in the upper portion of the figure indicate the direction of magnetization established by the preset signal whereas the direction of the arrows in the lower portion of the figure indicate the direction of flux reversal magnetization achieved by the pulse input signal. If, now a suitable varying MMF signal is applied to the read input winding 22, an output voltage will be induced at the read output winding 24 which will have an average amplitude related to the axial location of the interface between oppositely magnetized regions. An idealized relation between the average amplitude of the read output voltage ($E_{out}$) and the location of the magnetic interface is shown in FIG. 3. Obviously, the constant slope can be achieved only if the magnetic inerface moves a fixed amount in response to each input pulse (i.e. the same number of lines are switched for each pulse). This idealized relationship can be very closely approximated but only, however, if certain requirements are met. To appreciate these requirements, the nature of the pulse switching phenomenon will be investigated.

The flux reversal or switching from one remanent state to another is dependent upon Faraday's Law, as follows:

$$Et=2NaB_s10^{-8}=2N\phi 10^{-8} \quad (1)$$

where:

E=terminal voltage at winding 18 (volts)
$t$=pulse duration (seconds)
N=number of turns in magnetizing winding 18
$a$=area of magnetic core section whose flux is reversed (cm.$^2$)
$B_s$=saturation flux density in the reversed area (gauss)
$\phi$=number of lines reversed In Equation 1, the terminal voltage E is, in a practical case, formed of two components, one of which does not effect irreversible flux switching in the core, and which tend to impart non-linearity to the device during pulsed operation so that the idealized case in FIG. 3 is not realized. Specifically, the component of E which does effect flux switching tends to decrease for each successive pulse so that the number of lines switched decreases, and thereby imparts non-linearity to the slope of the curve in FIG. 3. That is to say, the terminal voltage E is composed of a component $E_{core}$ flux which is available to effect flux switching and a component IR in which R is the sum of the coil resistance and the voltage source resistance. Mathematically, this is stated as follows:

$$E=E_{core\ flux}+IR \quad (2)$$

It will be obvious from Equation 2 that for a fixed pulse amplitude ($E$=constant), the voltage available for flux switching, $E_{core\ flux}$, will remain constant for successive pulses only if the term IR remains constant also. Since R is a constant, it follows that linearity of movement of the magnetic interface along the length of the core for pulse switching in the manner discussed above, can occur only if variations in $E_{core\ flux}$ due to changes in the current term I in Equation 2 are minimized.

If I and R are both minimized, variations in $E_{core\ flux}$ may also be minimized and the ideal case shown in FIG. 3 may be approached. If variations in I are also minimized, variations in $E_{core\ flux}$ due to the IR term for successive pulses can be reduced to such an insignificant amount that the aforesaid linearity (FIG. 3) is possible. R may be reduced by using a pulse voltage source of very low internal impedance and by the use of input conductors of large cross-sectional area. I may be reduced by using a core of small dimension and of material having low coercive force. The I term may be reduced by increasing the number of turns of the input winding 18 and by using samll cores having low threshold MMF requirements. Variations in I may, on the other hand, be minimized by minimizing the net change in magnetic path length from the small to the large end of the core and by assuring that what net change is employed varies uniformly. This requires large values of the angle $\alpha$ (FIG. 1), that is, very little taper of the tubular core body, and also requires that distortions in path length due to the presence of a conventional, relatively large-dimensioned minor aperture be avoided. The tubular core construction employed herein allows the use of a slit for the minor aperture and, as will be seen hereinafter, construction by thin film deposition allows the minor aperture to be used without distorting magnetic path length.

A slight amount of net change in magnetic path length is, however, required in order to assure that progressive switching takes place. In this respect also, it is necessary that the wall thickness of the core be such as to assure switching predominantly by domain wall motion (as opposed to domain rotation), this being a requirement of all cores according to this invention. The thickness required to assure predominance of domain wall motion switching will, of course, depend upon the material selected for the core.

Figure 4:
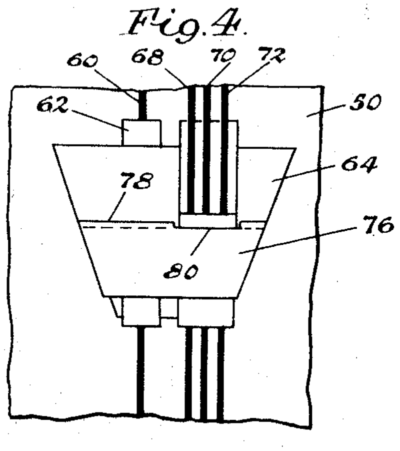
FIG. 4 is a plan view of a thin film device constructed in accordance with this invention.
Figure 5:
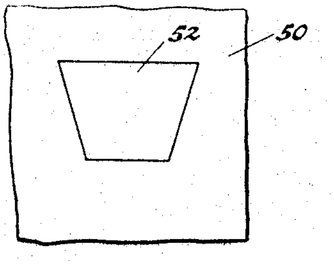
FIGS. 5–10 are sequential views illustrating progressive steps in construction of the thin film device in FIG. 4.
Figure 6:
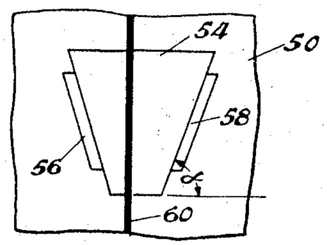
Figure 7:
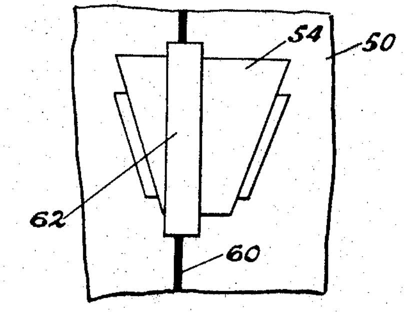
Figure 8:
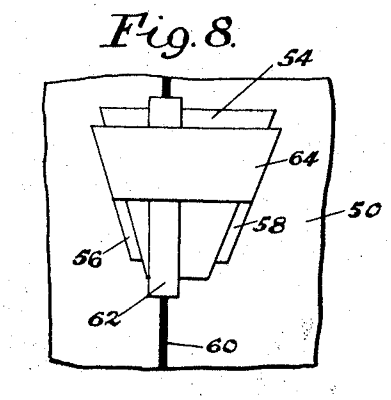
Figure 9:
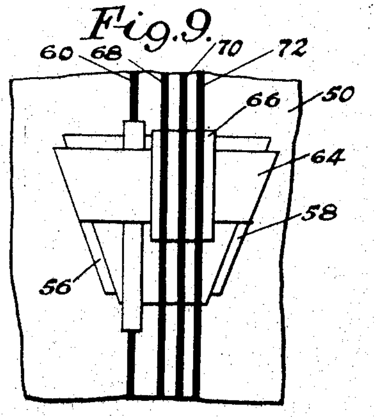
Figure 10:
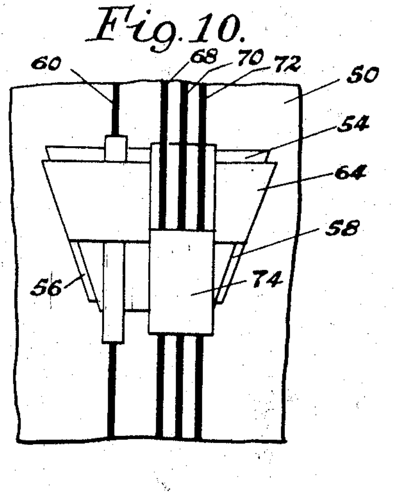

All of the above may be realized by using conventional vacuum deposition techniques. To illustrate, reference is now had to FIG. 4. In this figure, a suitable insulating substrate upon which the layers hereinafter described are laid is indicated by the reference character 50. Upon this substrate, a layer of rectangular B–H loop material composed preferably of 80% nickel and 20% iron is deposited by vacuum deposition. This layer, 52, is of trapezoidal area as shown in FIG. 5 and its configuration is achieved by suitable masking techniques. Over the layer 52 is next deposited a layer of insulating material 54 (preferably silicon monoxide)—FIG. 6, which leaves only the opposite side edges 56 and 58 of the layer 52 exposed. Next the input winding conductor 60 (preferably copper) is deposited over the insulating layer 54 as shown in FIG. 6 and a suitable length of this conductor is covered by another insulating layer 62 (FIG. 7). Next a trapezoidal area or layer 64 of the rectangular B–H loop material is superimposed over the upper half of the layer 52 so that these two layers are joined through portions of the exposed edges 56 and 58, as shown in FIG. 8. An insulating layer 66 is deposited over the layer 64 as shown in FIG. 9, and then bias, read input and read output conductors 68, 70 and 72 are deposited as is also shown in FIG. 9. The bias winding 68 is optional and is used only to avoid ambiguity in the read output signal. That is, the bias winding is used to apply a signal which maintains the lower half of the core body in the direction of magnetization established by the preset signal so that only the portion above the minor aperture is used for storage in spite of any subsequent pulse input. As a consequence, only the righthand side of the $E_{out}$ signal, FIG. 3, may appear. Next, an insulating layer 74 is deposited as in FIG. 10 and, lastly, the lower half of the outside layer of the rectangular B–H loop material is deposited as shown in FIG. 4 so that its upper edge slightly overlaps the layer 64 except in the region of the minor aperture 80 where the edges are substantially coplanar. This assures that distortions of the magnetic paths in the region of the minor apertures does not arise.

If, in the construction shown in FIGS. 4–10, the angle $\alpha$ (FIG. 6) controlled by the insulating layer 54 is made very nearly 90°, and the thickness of the layers 52, 64 and 76 are made very small but still large enough to retain predominantly domain wall motion switching, there will be only slight, but finite, change in path length from the smaller to the larger end of the magnetic core. This, as described above, tends to improve linearity of the pulse operation as aforesaid which, taken in conjunction with reduction in threshold MMF achieved by the small size and volume made possible by the thin film construction technique, the large permeability of the core material used, etc., permits of substantially linear pulse switching operation, as in FIG. 3. It is understood, of course, that the particular rectangular B–H loop material specified is influenced as by an external magnetic field to obtain orientation of the easy axis of magnetization in the circumferential directions as shown in FIG. 1. The magnetic core shown in FIGS. 4–10 is capable of obtaining at least ten readily distinguishable levels of storage in which read output is essentially linear as shown in FIG. 3.

Figure 11:
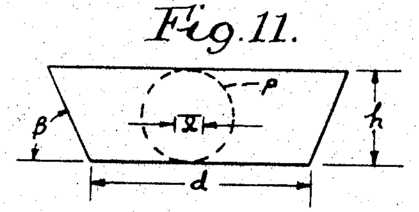
FIG. 11 is a plan view of a thin film device constructed according to this invention and illustrating certain dimensional characteristics thereof.

To more clearly set forth the requirements of a thin film device according to FIGS. 1, 2 and 4–10, and employing the specific material as aforesaid, reference is had to FIG. 11 and the following table:

TABLE I

| | |
|---|---|
| $\beta=85°$ | $d=0.2''$ |
| $h=0.1''$ | $l=0.015''$ |

Wall thickness uniform, not less than about 5000 angstroms.

In connection with FIG. 11, it will be appreciated that the core dimensions must be such, for non-destructive read, that the length of the largest minor aperture magnetic path P be substantially less than the magnetic path length at the small end of the core.

The preceding description deals only with a magnetic-core device in which switching occurs in response to a voltage-time pulse input. It is pointed out, however, that current switching may also be employed with the core as described, with the read function remaining the same. In this case, a slowly varying mmf. is employed for switching and the function attained is to move the magnetic interface to a position reflecting the maximum value of the current producing maximum MMF ($F=NI$, where N is number of turns). Moreover, as opposed to pulse switching ($v$-$t$ switching) the current switching method does not require minimization of the major aperture magnetic path length variation along the length of the core and, for this reason, the angle $\alpha$ may be made as small as is necessary. In fact, since current switching is dependent only on magnetic path length, a host of possibilities is offered in conjunction with this type of switching.

Figure 12:
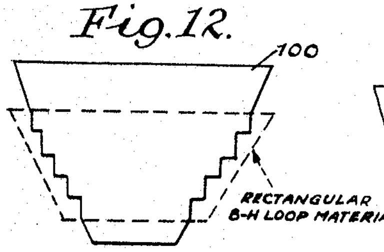
FIGS. 12 and 13 illustrate a modified form of the invention.
Figure 13:
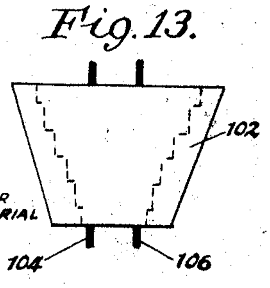

For example, a magnetic core as shown in FIG. 13 may be made by using an insulator 100 having stepped sides as shown in FIG. 12. That is, using generally the technique described in conjunction with FIGS. 4–10, the insulator 54 of FIG. 6 is replaced with the insulator 100. The result is a magnetic-core body 102 (FIG. 13) having major aperture magnetic path lengths which are of stepped, increasing value along the length of the core. If, now, a ramp input MMF signal 108 (FIG. 14) is applied to the input conductor 104, a pulse voltage output ($p_1$, $p_2$—FIG. 14) will be induced in the output conductor 106 every time the input 108 is of sufficient magnitude to produce the coercive force corresponding to the magnetic path length of the region being switched. Mathematically, this may be expressed as follows:

$\mathrm{MMF}=F=NI$ (input signal 108)

Figure 14:
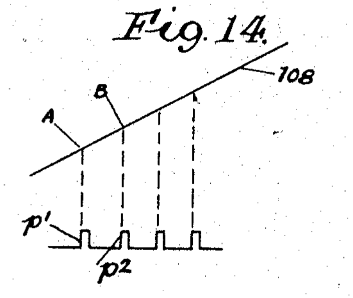
FIG. 14 is a graph illustrating the relation between input and output with relation to the modified form of invention shown in FIG. 13.

$H_{c_1}=F/l_1$ where:

$H_{c_1}$=coercive force of region of core having magnetic path length $l_1$, and producing the pulse output $p_1$ (FIG. 14)

The above relates to point A and pulse $p_1$ in FIG. 14, an increase in $H_c$ to the value at point B producing the pulse $p_2$ and so on. If the core wall thickness is uniform and the steps are all of equal heighth, the pulses will be of equal spacing, constant amplitude and of equal width since the number of lines switched in each step-band or ring will be the same and the $d\phi/dt$ caused by switching each band will be the same.

Figure 15:
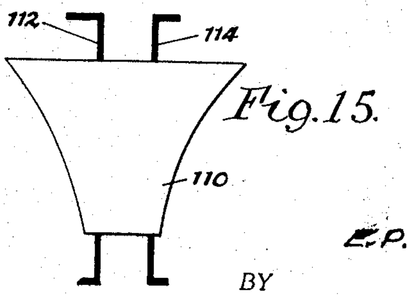
FIG. 15 is a plan view of a further modification of the invention.

Another possibility for current switching is shown in FIG. 15. In this case, the sides of the thin film core body 110 are curvilinear so that in response to the ramp input 108 of FIG. 14, on conductor 112, a voltage will be induced in the output winding 114 which is related to the curvilinear shape of the core sides. In other words, the variation in magnetic path lengths along the length of the core is non-linear so that switching produced $d\phi/dt\neq k$ (a constant) as switching progresses.

The forms specifically illustrated and described above represent only a few applications of the present invention.

However, it will be noted that the generic feature of this invention concerns a magnetic-core device having a major aperture and a region surrounding such major aperture which provides closed paths of easy magnetization around the major aperture which are of increasing lengths at different zones of this region from one side of the region to the other, together with input means for progressively switching such zones; and in combination therewith, the region is shaped to provide uniform variation of the total switched flux of the region in response to fixed increments of the flux reversing input. Thus, for the device as shown in FIG. 1, the region, which may encompass the entire body of the core, is shaped to provide a uniform linear variation in total switched flux in response to fixed increments of the flux reversing input; the device shown in FIG. 13 is shaped to provide a uniform stepped variation in total switched flux in response to fixed increments of the flux reversing input; and the device shown in FIG. 15 is shaped to provide a uniform curvilinear variation in total switched flux in response to fixed increments of the flux reversing input. In the case of FIG. 1, the uniform linear variation in total switched flux in response to fixed increments of the input allows the magnetic interface between oppositely magnetized portions to be positioned so as to produce a linear read input-output relation (FIG. 3). In the case of FIG. 13, the uniform stepped variation in total switched flux in response to fixed increments of the input allows the pulse output shown (FIG. 14). It is to be noted, however, that the linear uniformity of the steps in FIG. 13 may be modified, as for example by being curvilinearly uniform to produce unequal spacing between pulses, etc.

It should also be borne in mind that the tubular arrangement according to this invention and constructed by deposition techniques allows the use of as many minor apertures as may be desired without introducing magnetic path length distortions such as are produced by the minor apertures of conventional multiaperture cores. Thus, in a device employing steps, such as in FIG. 13, and which is employed as a memory or storage device such as would be accomplished by applying MMF thereto which is insufficient to switch the entire core, a minor aperture could be placed at each step. Then, common pulse drive to all of the minor apertures, either simultaneously or in sequence, would result in a pulse readout at that single minor aperture located at the interface between the two oppositely magnetized portions of the core.

I claim:

1. A magnetic-core device comprising,
   - a body of magnetic material having a major aperture and having a region surrounding said major aperture which provides closed magnetic paths of easy magnetization around the major aperture which are of progressively increasing lengths at different zones of said region from one side of said region to the other,
   - means for establishing said region of the body in one major remanent state thereof,
   - means for applying a flux reversing input to said body to progressively switch said zones to the opposite remanent state commencing with that zone of smallest magnetic path length,
   - said region being shaped to uniformly vary the total switched flux of said region in response to fixed increments of the flux reversing input.

2. The magnetic-core device according to claim 1 wherein said region is shaped as a straight-tapering tube minimizing net change of magnetic path length from one side of the region to the other, the wall thickness of the tube being great enough to assure switching predominantly by domain wall motion.

3. The magnetic-core device according to claim 1 wherein said region is shaped as a curvilinearly tapering tube, the wall thickness of the tube being great enough to assure switching predominantly by domain wall motion.

4. The magnetic-core device according to claim 1 wherein said region is shaped as a stepped tube, the wall thickness of said tube being great enough to assure switching predominantly by domain wall motion.

5. A magnetic-core device comprising a tubular body defining at one cross-section thereof, a magnetic path of predetermined minimum length and, at another cross-section thereof, a magnetic path of predetermined length greater than said minimum length, said two cross-sections being separated axially of the body and the body being, at all points between such sections, of magnetic path lengths varying progressively between said minimum and greater lengths,
   - said body being of wall thickness sufficient to assure flux switching predominantly by domain wall movement.

6. A magnetic-core device comprising a tubular body having a single axially extending opening, said body defining, at one cross-section thereof, a magnetic path of predetermined minimum length and, at another cross-section thereof, a magnetic path of a length greater than said minimum length, said two cross-sections being axially separated on the body and the body being, at all points between said sections, of magnetic path length varying progressively between said minimum and greater lengths,
   - means for initially magnetizing said body in one circumferential direction thereof,
   - and means for partially switching the direction of magnetization in said body commencing at said cross-section of minimum magnetic path length to be in the opposite circumferential direction.

7. A thin film electronic component comprising, in combination, a supporting substrate, a layer of rectangular B-H loop magnetic material deposited on said substrate with its axis of easy magnetization oriented parallel to a fixed axis, an insulating layer deposited over said magnetic material and leaving only opposite side edges thereof exposed, a second layer of rectangular B-H loop magnetic material deposited over said insulating layer with its axis of easy magnetization oriented parallel with the first layer and contacting the first layer along the said opposite side edges thereof, the opposite sides of said insulating layer which expose the opposite side edges of said first layer being non-parallel for at least portions of their length to define closed magnetic paths through the two layers of rectangular B-H loop material which are of increasing length.

8. The component according to claim 7 wherein the opposite sides of said insulating layer are stepped.

9. The component according to claim 7 wherein the opposite sides of said insulating layer are straight.

10. The component according to claim 7 wherein the opposite sides of said insulating layer follow paths which are curvilinear.

11. The component according to claim 10 wherein the opposite sides of said insulating layer are stepped.

12. A magnetic-core device comprising, a generally tubular body having a single axially extending opening therethrough, said body being of magnetic material oriented to provide easy paths of magnetization circumferentially thereof, a conductor extending axially through said body, said body having an interior surface portion providing circumferential magnetic paths in the body around said conductor which are of increasing lengths axially along said body.

13. A magnetic-storage device having non-destructive readout characteristics, which comprises, a body of magnetic material oriented to provide easy paths of magnetization circumferentially thereof, said body being of tubular side wall form providing an axial opening therethrough, a conductor extending axially through said body, said body having an interior surface configuration providing magnetic paths around said conductor which are of increasing lengths axially along said body, and providing a minimum magnetic path length at one axial position on the body remote from one end thereof, and a pair of conductors extending through the side wall of said body between said one axial position and said one end thereof.

14. A magnetic-core device having variable storage and non-destructive readout characteristics, which comprises, a generally tubular body of magnetic material oriented to provide easy paths of magnetization circumferentially thereof, having a circumferentially extending slit intermediate its ends, the inner surface configuration of said body providing circumferential magnetic paths varying between minimum and maximum values along the length of the body in a region thereof which includes said slit, a conductor extending axially through said body for initially magnetizing said body, including said region thereof, in one direction, and subsequently reversing the direction of flux in a selected extent of said region, and an interrogating conductor and a readout conductor extending through said slit.

15. A magnetic-core device comprising, a hollow magnetic body having maximum permeability peripherally thereof and dimensioned to provide magnetic-path lengths in the directions of maximum permeability which vary progressively in magnitude at different axial positions on the body along its length, means for selectively magnetizing said body in one peripheral direction, and means for selectively reversing the direction of magnetization of portions of said body.

16. A magnetic-core device comprising, an elongate hollow body having a single axially extending opening therethrough, said body being constructed of magnetic material having rectangular B–H loop characteristics and an easy axis of magnetization extending circumferentially of the body, a conductor extending through said opening of said body, said body being shaped to provide magnetic paths around said conductor which are of increasing lengths axially along said body.

17. A magnetic-storage device having non-destructive readout characteristics, which comprises, a body of rectangular B–H loop magnetic material of tubular side wall form providing an axial opening therethrough and having an easy axis of magnetization extending circumferentially, a conductor extending axially through said body, said body being shaped to provide magnetic paths around said conductor which are of increasing lengths axially along said body, and providing a minimum magnetic path length at one axial position on the body remote from one end thereof, and a pair of conductors extending through the side wall of said body between said one axial position and said one end thereof.

18. A magnetic-core device having variable storage and non-destructive readout characteristics, which comprises, a generally tubular body of rectangular B–H loop magnetic material having an easy axis of magnetization extending circumferentially thereof and having a circumferentially extending slit intermediate its ends, said body being shaped to provide circumferential magnetic paths varying between minimum and maximum values along the length of the body in a region thereof which includes said slit, a conductor extending axially through said body for initially magnetizing said body, including said region thereof, in one direction, and subsequently reversing the direction of flux in a selected extent of said region, and an interrogating conductor and a readout conductor extending through said slit.

19. A magnetic-core device comprising, a hollow magnetic body having a single axially extending opening therethrough, said body having maximum permeability peripherally of said opening and dimentioned to provide magnetic-path lengths in the directions of maximum permeability which vary in magnitude at different axial positions on the body, and means for selectively magnetizing axially adjacent bands of said body in relatively opposite peripheral directions to provide a peripheral interface zone of null flux between said bands which may be selectively positioned axially of the body.

20. A magnetic-core device comprising, a body of magnetic material having a single axially extending opening therethrough presenting a major aperture and having a region surrounding said major aperture which provides closed magnetic paths of easy magnetization around the major aperture, means for establishing said region of the body in one major remanent state thereof, means for applying a flux reversing input to said body to instantaneously switch less than all of said region to the opposite major remanent state thereof, and output means for obtaining a signal output related to the change in flux produced by said flux reversing input, said body being shaped in said region to provide an output signal as aforesaid which is related in predetermined fixed manner to the flux reversing input.

21. The magnetic-core device as defined in claim 20 wherein the predetermined fixed relation between said flux reversing input and said output signal is linear.

22. The magnetic-core device as defined in claim 20 wherein the predetermined fixed relation between said flux reversing input and said output signal is non-linear.

References Cited

UNITED STATES PATENTS

| | | | |
|---|---|---|---|
| 2,962,701 | 11/1960 | Rajchman | 340—174 |
| 3,207,976 | 9/1965 | Stimler | 307—88 X |

BERNARD KONICK, *Primary Examiner.*

JOSEPH F. BREIMAYER, *Assistant Examiner.*

U.S. Cl. X.R.

307—88